(12) United States Patent
Takagi et al.

(10) Patent No.: US 6,594,115 B2
(45) Date of Patent: Jul. 15, 2003

(54) SUSPENSION WITH CHAMFERED EDGE FOR DISC DRIVE

(75) Inventors: Yasuji Takagi, Ebina (JP); Takeshi Kamisaku, Aiko-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 116 days.

(21) Appl. No.: 09/809,148

(22) Filed: Mar. 15, 2001

(65) Prior Publication Data

US 2002/0051320 A1 May 2, 2002

(30) Foreign Application Priority Data

Oct. 30, 2000 (JP) ........................................ 2000-331125

(51) Int. Cl.$^7$ ................................................ G11B 5/60
(52) U.S. Cl. ...................................................... 360/245
(58) Field of Search .............................. 360/245, 245.2, 360/245.3, 245.4, 245.5, 265.7, 265.8, 265.9, 245.9, 244.2, 244.3, 244.4, 266, 244.1, 128; 29/603.03

(56) References Cited

U.S. PATENT DOCUMENTS

| | | | |
|---|---|---|---|
| 4,189,759 A | * | 2/1980 | Bauck et al. ............... 360/128 |
| 4,991,045 A | | 2/1991 | Oberg ...................... 360/244.3 |
| 6,282,062 B1 | * | 8/2001 | Shiraishi .................. 360/244.1 |
| 6,297,934 B1 | * | 10/2001 | Coon ....................... 29/603.03 |
| 6,377,424 B1 | * | 4/2002 | Yaeger ........................ 360/245 |
| 6,381,099 B1 | * | 4/2002 | Mei ........................ 360/244.3 |
| 6,417,995 B1 | * | 7/2002 | Wu et al. .................... 360/245 |

FOREIGN PATENT DOCUMENTS

JP 60-127578 7/1985

OTHER PUBLICATIONS

M. Hanya et al, "Suspension Design for Windage and High Bandwidth", (Treatise), Presented on Mar. 27, 2000, Japan.

* cited by examiner

Primary Examiner—Hoa T. Nguyen
Assistant Examiner—Tianjie Chen
(74) Attorney, Agent, or Firm—Frishauf, Holtz, Goodman & Chick, P.C.

(57) ABSTRACT

In a suspension for disc drive that comprises a beam portion having an edge portion and a wired flexure attached to the beam portion so as to be superposed thereon and having an extending portion extending across the edge portion of the beam portion, the edge portion of the beam portion crossed by the extending portion of the flexure is formed having a chamfered portion for preventing fretting.

8 Claims, 4 Drawing Sheets

SUSPENSION WITH CHAMFERED EDGE FOR DISC DRIVE

CROSS-REFERENCE TO RELATED APPLICATIONS

This application is based upon and claims the benefit of priority from the prior Japanese Patent Application No. 2000-331125, filed Oct. 30, 2000, the entire contents of which are incorporated herein by reference.

BACKGROUND OF THE INVENTION

The present invention relates to a suspension for disc drive incorporated in an information processing apparatus, such as a personal computer.

A hard disc drive (HDD) for recording in and reading information from a rotating magnetic disc or magneto-optical disc includes a carriage that can turn around a shaft. The carriage is rotated around the shaft by means of a positioning motor. The carriage is provided with an arm (actuator arm), a suspension mounted on the distal end portion of the arm, a head portion including a slider mounted on the suspension, etc.

When the disc rotates, the slider on the distal end portion of the suspension slightly lifts off the disc surface, whereupon an air bearing is formed between the disc and the slider. The suspension comprises a base portion including a base plate, a beam portion formed of a precision plate spring, a flexure fixed to the beam portion by laser welding or the like, etc.

With the advance of compaction of information recorded in the disc and speed-up of the disc drive operation, the disc drive of this type has been requiring a shorter seek time. In order to shorten the seek time, the disc rotation must be speeded up.

The flexure is formed into various shapes according to required specifications. By way of example, a so-called wired flexure has been developed such that a wiring portion is formed along a beam portion on the surface of a flexure that extends in the longitudinal direction of the beam portion. One end of the wiring portion of the wired flexure is connected to a terminal of the slider at the distal end portion of the flexure. The other end of the wiring portion extends toward the proximal portion of the beam portion, and is connected to a terminal closer to an actuator, for example.

If a wired flexure that partially crosses an edge portion of a beam portion swings under the influence of air turbulence that is caused over the surface of a rotating disc, the flexure may possibly touch the beam portion. Depending on the shape of the edge portion of the beam portion, a contact portion between the beam portion and the flexure may be fretted, possibly causing contamination (with minute contaminants).

BRIEF SUMMARY OF THE INVENTION

Accordingly, the object of the present invention is to provide a suspension capable of avoiding an awkward situation that may be caused when an attachment such as a flexure that is attached to a beam portion touches the beam portion.

In order to achieve the above object, a suspension for disc drive in a first aspect of the present invention comprises a beam portion having an edge portion and an attachment attached to the beam portion so as to be superposed thereon and having an extending portion extending across the edge portion of the beam portion, in which the edge portion of the beam portion crossed by the extending portion is formed having a chamfered portion for preventing fretting such that the edge portion is reduced in thickness so that the distance from the extending portion gradually increases toward an end face of the edge portion. According to this invention, the attachment can be prevented from touching a sharp edge of the edge portion of the beam portion when it swings, so that contamination can be avoided. Thus, the invention is also applicable to a disc drive in which a disc rotates at high speed.

In order to achieve the above object, a suspension for disc drive in a second aspect of the invention comprises a base portion, a beam portion having an edge portion, a hinge member connecting the base portion and the beam portion to each other, and an attachment attached to the beam portion so as to be superposed thereon and having an extending portion extending across the edge portion of the beam portion, in which the edge portion of the beam portion crossed by the extending portion is formed having a chamfered portion such that the edge portion is reduced in thickness so that the distance from the extending portion gradually increases toward an end face of the edge portion. In the suspension according to this invention designed so that the base portion and the beam portion are connected to each other by means of the hinge member, the attachment can be prevented from touching a sharp edge of the edge portion of the beam portion when it swings, so that contamination can be avoided. Thus, the invention is also applicable to a disc drive in which a disc rotates at high speed.

In each of the suspensions in the first and second aspects, an example of the attachment is a wired flexure. If the wired flexure swings under the influence of air turbulence or the like, occurrence of contamination that may be caused when the flexure touches the edge of the beam portion can be avoided. However, the chamfered portion may be formed on any other attachment than the flexure, e.g., the edge of the beam portion that is crossed by a wiring member. Further, the chamfered portion may be formed on any other edge portion than the side edge portion of the beam portion. In short, the chamfered portion should only be formed on an edge portion that is expected to touch the attachment.

The chamfered portion may be formed by plastically deforming a part of the edge portion of the beam portion by coining, a kind of pressing, for example. According to this invention, the chamfered portion formed by coining has a smooth surface. Alternatively, the chamfered portion may be formed by partially etching the edge portion of the beam portion. According to this invention, the chamfered portion can be easily formed by partial etching.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
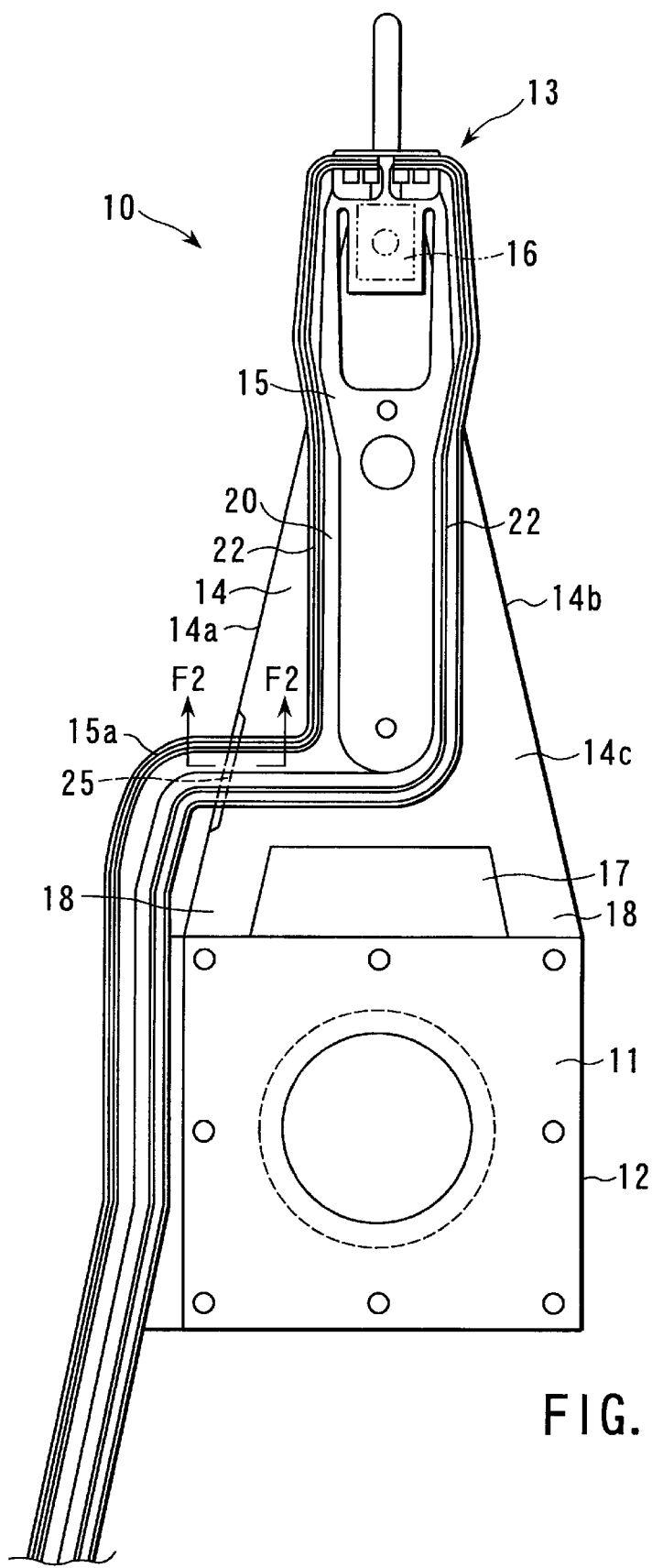
FIG. 1 is a plan view of a suspension for disc drive according to a first embodiment of the present invention.

A first embodiment of the present invention will now be described with reference to FIGS. 1 to 3. A suspension 10 according to this embodiment comprises a base portion 12 including a base plate 11, a beam portion 14 extending from the base portion 12 toward a head portion 13 of the suspension 10, and a wired flexure 15 as an example of an attachment that is attached to the beam portion 14. A slider 16 that constitutes the head portion 13 is mounted on the distal end portion of the flexure 15. The base portion 12 is fixed to an actuator arm (not shown) of a disc drive. Hinge portions 18 are formed individually on the opposite sides of an aperture 17 in the proximal portion of the beam portion 14.

The wired flexure 15 is attached to the beam portion 14 so as to be superposed in the thickness direction of the beam portion 14. The flexure 15 has an extending portion 15a that extends along the beam portion 14 toward the actuator arm. The extending portion 15a extends across one edge portion 14a, out of two opposite side edges portions 14a and 14b, of the beam portion 14 toward the base portion 12.

Figure 2:
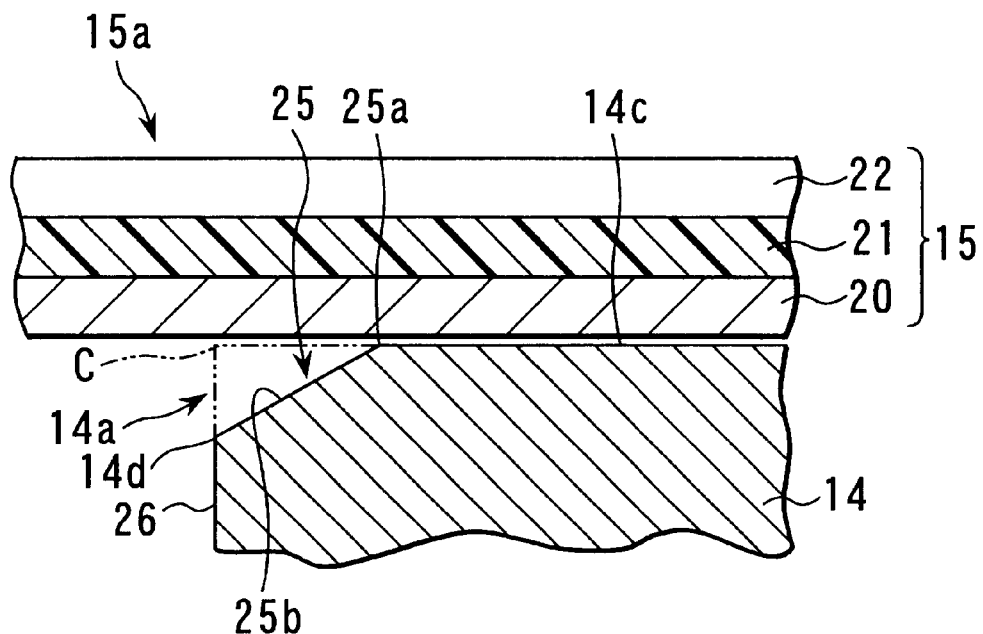
FIG. 2 is a sectional view of a part of the suspension taken along line F2—F2 of FIG. 1.

As shown in FIG. 2, the wired flexure 15 includes a substrate 20 formed of a plate spring (e.g., rolled stainless steel) that is thinner than the beam portion 14, an electrical insulating layer 21 of a synthetic resin, such as polyimide, formed on the substrate 20, a conducting portion 22 formed on the insulating layer 21, etc. A part of the substrate 20 is opposed to a surface 14c of the beam portion 14. The conducting portion 22 has a desired wiring pattern formed by etching or plating a conductive layer of copper or the like.

A chamfered portion 25 for preventing fretting is formed on that part of the edge portion 14a of the beam portion 14 which faces the extending portion 15a of the flexure 15. The tapered chamfered portion 25 is formed in a manner such that the thickness of the edge portion 14a is reduced by coining so that the distance from the extending portion 15a or the substrate 20 gradually increases as an edge 14d of an end face 26 of an edge portion 14 a is approached. In FIG. 2, the two-dot chain line represents an edge portion present before chamfering, indicating the former presence of a sharp edge C.

Preferably, as shown in FIG. 2, the chamfered portion 25 includes a curved surface portion 25a plastically worked so as to be smoothly continuous with the flat surface 14c of the beam portion 14, a slope portion 25b that ranges from the curved surface portion 25a to the end face 26 of the edge portion 14a, etc. Coining is a kind of plastic working that is carried out by means of pressing equipment. The compact smooth chamfered portion 25 can be formed by pressing a part of the edge portion 14a of the beam portion 14 by means of a press die that has a precise molding surface.

Figure 3:
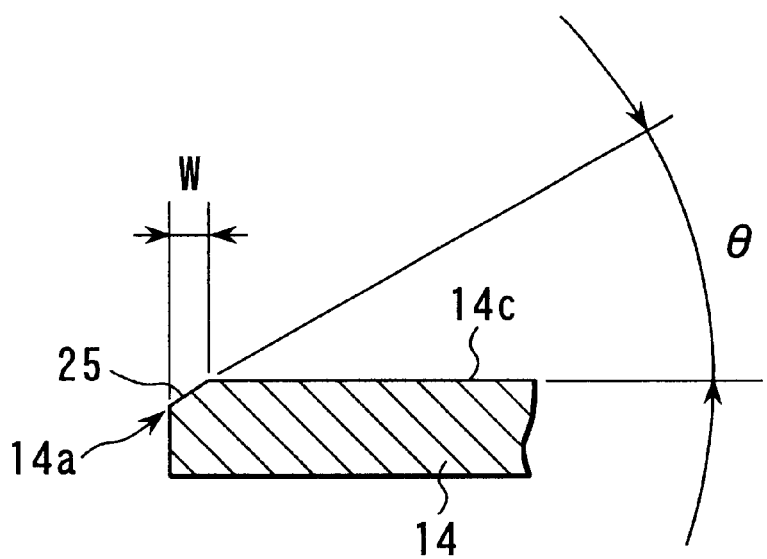
FIG. 3 is a sectional view of a part of a beam portion of the suspension shown in FIG. 1.

As shown in FIG. 3, an angle θ between the chamfered portion 25 and the surface 14c of the beam portion 14 is about 30°, for example. A width W of the chamfered portion 25 is about 40 µm, for example. The chamfered portion 25 may be formed by partial etching in place of coining.

In the beam portion 14 having the chamfered portion 25 formed in this manner, the edge portion 14a that is crossed by the flexure 15 is smoothly chamfered without any sharp edge. If the flexure 15 swings under the influence of air turbulence that is caused when a disc rotates at high speed, therefore, the flexure 15 can be prevented from touching a sharp edge of the beam portion 14, so that occurrence of contamination that is attributable to fretting can be avoided. If the flexure 15 touches the chamfered portion 25, the contact pressure can be made lower than in the conventional case where the flexure touches a sharp edge. Since the chamfered portion 25 is finished into a smooth surface by coining, moreover, the occurrence of contamination can be avoided.

Figure 4:
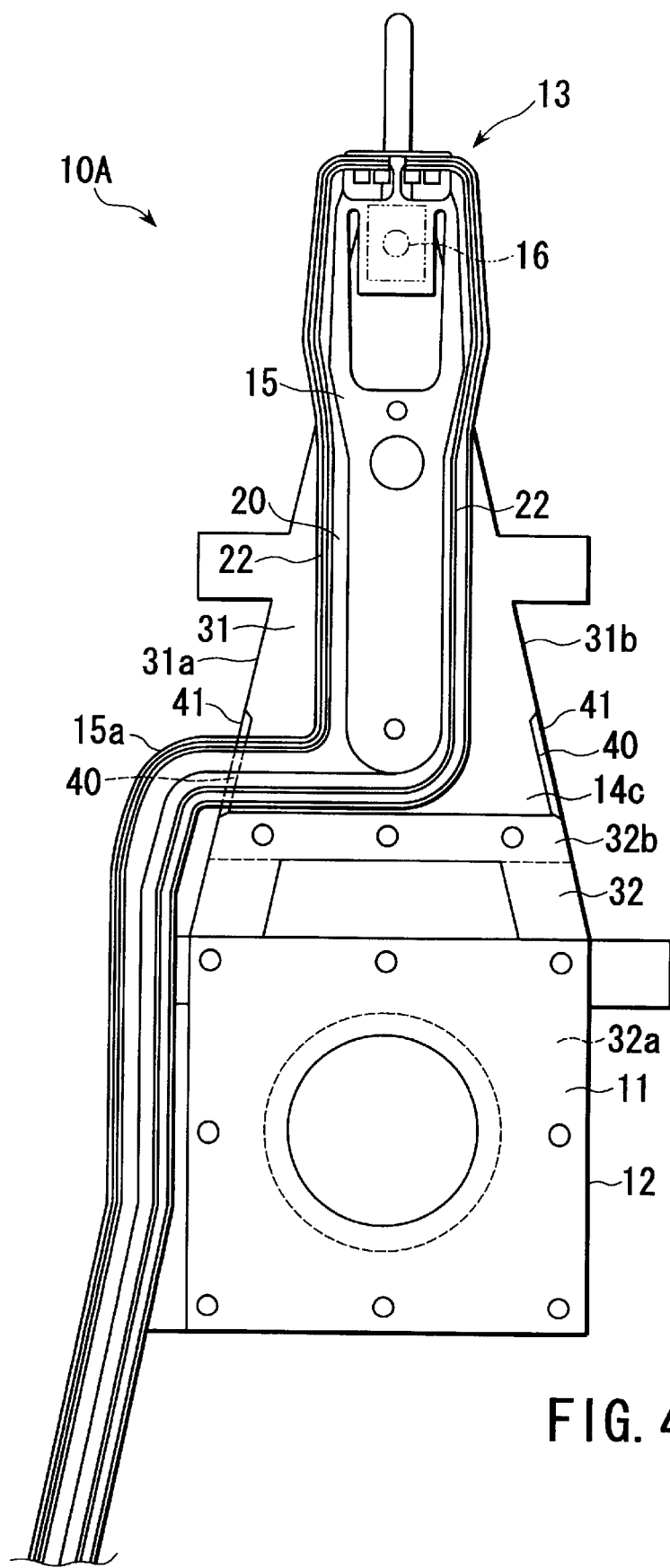
FIG. 4 is a plan view of a suspension for disc drive according to a second embodiment of the present invention.

FIG. 4 shows a suspension 10A according to a second embodiment of the present invention. The suspension 10A comprises a base portion 12, a beam portion 31, a hinge member 32 that connects the base portion 12 and the beam portion 31 to each other, a wired flexure 15 attached to the beam portion 31, etc. A base plate 11 is fixed to the base portion 12.

The hinge member 32 is formed of a plate spring member, e.g., a rolled stainless-steel plate, which is thinner than the base portion 12 and the beam portion 31. One portion 32a of the hinge member 32 is fixed to the base portion 12, and the other portion 32b to the rear end portion of the beam portion 31.

The hinge member 32 of this embodiment is composed of a component that is separate from the base portion 12 and the beam portion 31. Therefore, a spring member of a material and a thickness that meet required properties of the hinge member 32 can be adopted without regard to the base portion 12 and the beam portion 31. Thus, properties (e.g., high stiffness) that are required of the base portion 12 and the beam portion 31 can be easily reconciled with properties (e.g., low spring constant) that are required of the hinge member 32.

The wired flexure 15, like the flexure 15 shown in FIG. 2, includes a metal substrate 20, an electrical insulating layer 21 formed on the substrate 20, a conducting portion 22 formed on the insulating layer 21, etc. The substrate 20 of the flexure 15 that is fixed to the beam portion 31 is formed of a plate spring (e.g., rolled stainless steel) that is thinner than the beam portion 31 and the hinge member 32, and is fixed in a given position of the beam portion 31 by laser welding or the like. A slider 16 that constitutes a head portion 13 is mounted on the distal end portion of the flexure 15. For example, the beam portion 31 and the flexure 15 have thicknesses of about 100 µm and 20 µm, respectively.

The wired flexure 15 of this embodiment also has an extending portion 15a that crosses an edge portion 31a of the beam portion 31. A chamfered portion 40 for preventing fretting is formed on the edge portion 31a of the beam portion 31 that faces the extending portion 15a. The chamfered portion 40, like the chamfered portion 25 of the first embodiment, has its thickness reduced toward an end face 41 of the edge portion 31a of the beam portion 31.

Figure 5:
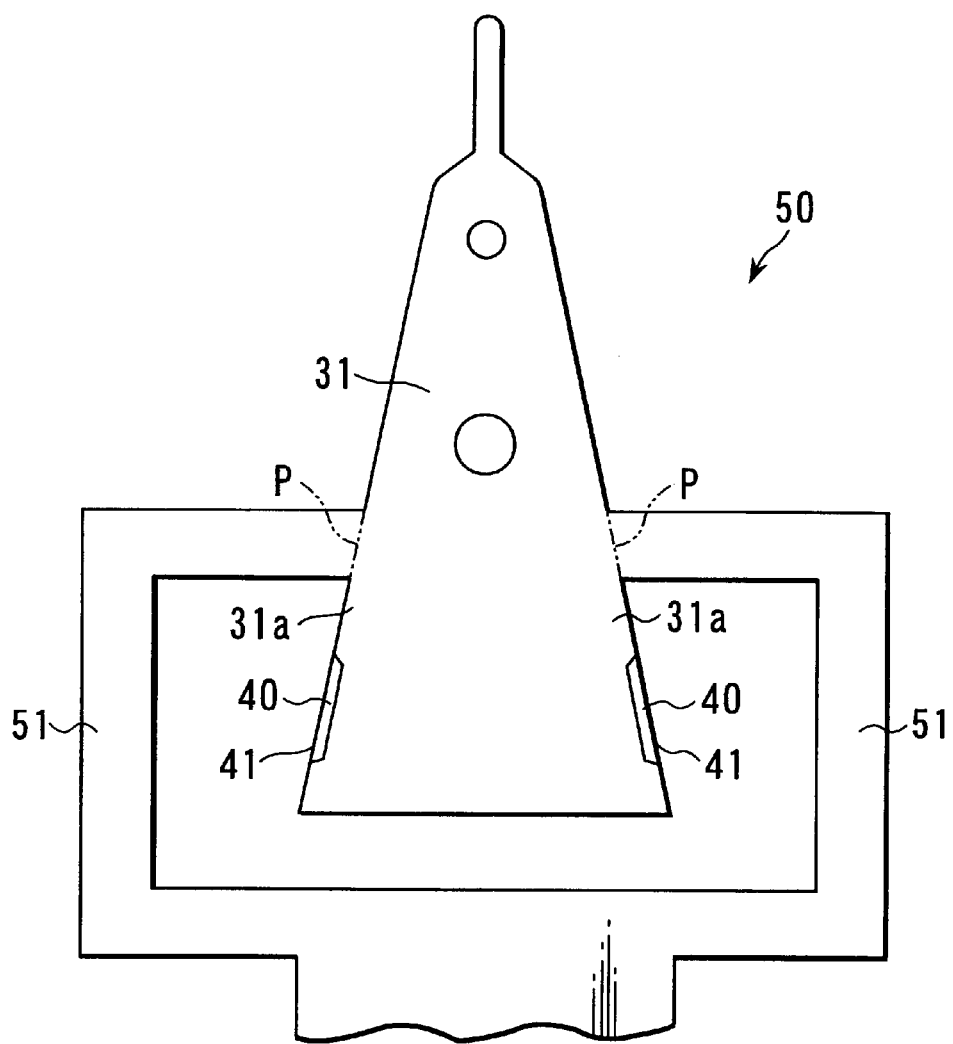
FIG. 5 is a plan view of a semi-finished product used in manufacturing the suspension shown in FIG. 4.

In manufacturing the suspension 10A, a semi-finished product 50 for the beam portion 31, having the shape shown in FIG. 5, is prepared by etching or the like. Thereafter, the hinge member 32 is fixed to the semi-finished product 50, and a connecting portion 51 is separated in a region indicated by two-dot chain line P. The chamfered portion 40 is formed by coining. In some cases, however, it may be formed by partial etching in a process for etching the semi-finished product 50 for the beam portion 31.

The chamfered portion 40 of the suspension 10A of this embodiment is formed on each of two opposite edge portions 31a and 31b of the beam portion 31 so that the extending portion 15a of the flexure 15 can be formed extending from either side of the beam portion 31. However, the chamfered portion 40 may be formed on only one (on the side the extending portion 15a of the flexure 15 crosses the beam portion 31) of the edge portions 31a and 31b.

Since the chamfered portion 40 is formed on the edge portion 31a of the beam portion 31 of the suspension 10A, the flexure 15 can be prevented from touching a sharp edge of the beam portion 31 if it swings under the influence of air turbulence or shock, so that occurrence of contamination can be avoided.

Figure 6:
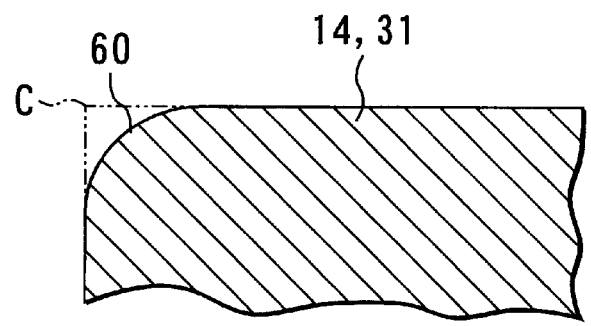
FIG. 6 is a sectional view of a part of a beam portion of a suspension according to a third embodiment of the invention.

As in the case of a third embodiment shown in FIG. 6, a chamfered portion 60 in the form of a curved surface having an actuate profile may be formed on an edge portion of a beam portion 14 or 31 by coining or partial etching. In FIG. 6, the two-dot chain line represents an edge portion present before chamfering, indicating the former presence of a sharp edge C.

It is to be understood, in carrying out the present invention including the embodiments described herein, that the components of the invention, including the configuration of the beam portion, attachment such as the flexure and its extending portion, chamfered portion, etc., may be variously changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for disc drive, comprising:
   a beam portion having a side edge portion extending in a longitudinal direction of the beam portion; and
   an attachment attached to the beam portion so as to be superposed thereon and having an extending portion extending across the edge portion of the beam portion, said extending portion being swingable relative to the beam portion,
   a part of the side edge portion of the beam portion being crossed by the extending portion and having a chamfered portion such that the side edge portion is reduced in thickness so that the distance from the extending portion gradually increases toward an end face of the edge portion.

2. A suspension for disc drive according to claim 1, wherein said attachment comprises a wired flexure.

3. A suspension for disk drive according to claim 1, wherein said chamfered portion is formed by plastically deforming the side edge portion of the beam portion by coining.

4. A suspension for disc drive according to claim 1, wherein said chamfered portion comprises a partially etched side edge portion of the beam portion.

5. A suspension for disc drive, comprising:
   a base portion;
   a beam portion having a side edge portion extending in a longitudinal direction of the beam portion;
   a hinge member connecting the base portion to the beam portion; and
   an attachment attached to the beam portion so as to be superposed thereon and having an extending portion extending across the side edge portion of the beam portion,
   a part of the side edge portion of the beam portion being crossed by the extending portion and having a chamfered portion such that the edge side portion is reduced in thickness so that the distance from the extending portion gradually increases toward an end face of the edge portion.

6. A suspension for disc drive according to claim 5, wherein said attachment comprises a wired flexure.

7. A suspension for disc drive according to claim 5, wherein said chamfered portion is a plastically deformed side edge portion of the beam portion.

8. A suspension for disc drive according to claim 5, wherein said chamfered portion comprises a partially etched side edge portion of the beam portion.

* * * * *